United States Patent [19]

Lee et al.

[11] 3,956,112

[45] May 11, 1976

[54] MEMBRANE SOLVENT EXTRACTION

[75] Inventors: Lester T. C. Lee, Parsippany, N.J.;
Win-Sow Ho, Webster, N.Y.;
Kang-Jen Liu, Somerville, N.J.

[73] Assignee: Allied Chemical Corporation, New York, N.Y.

[22] Filed: Mar. 13, 1975

[21] Appl. No.: 558,189

Related U.S. Application Data

[63] Continuation-in-part of Ser. No. 320,341, Jan. 2, 1973, abandoned.

[52] U.S. Cl. ............................ 210/22 C; 210/23 R; 210/321 R; 210/500 M
[51] Int. Cl.² .................. B01D 11/04; B01D 13/00; B01D 13/04
[58] Field of Search ............................... 210/21–23, 210/321, 500; 23/270.5; 55/16, 158

[56] References Cited
UNITED STATES PATENTS

| | | | |
|---|---|---|---|
| 2,960,462 | 11/1960 | Lee et al. ............................ | 210/500 |
| 3,244,763 | 4/1966 | Cahn .................................... | 210/22 |
| 3,299,157 | 1/1967 | Baddour et al. ..................... | 210/23 |
| 3,339,341 | 9/1967 | Maxwell et al. ..................... | 55/158 |
| 3,796,788 | 3/1974 | Blickle et al. ....................... | 23/270.5 |

*Primary Examiner*—Frank A. Spear, Jr.
*Assistant Examiner*—Ferris H. Lander
*Attorney, Agent, or Firm*—Arthur J. Plantamura

[57] ABSTRACT

A membrane solvent extraction system is utilized to separate two substantially immiscible liquids and extract a solute through a solvent swollen membrane from one solvent liquid phase to the extracting solvent liquid without direct contact between the liquid phases. The membrane extraction method has advantages over conventional solvent extraction and may be applied as the mechanism in separation, purification, pollutant removal and recovery processes.

20 Claims, 5 Drawing Figures

1

MEMBRANE SOLVENT EXTRACTION

CROSS REFERENCE TO RELATED APPLICATION

This application is a continuation-in-part application Ser. No. 320,341, filed Jan. 2, 1973, entitled "Membrane Solvent Extraction", and now abandoned.

BACKGROUND OF THE INVENTION

The present invention is directed to the use of a substantially non-porous membrane for solvent extraction employing two substantially immiscible liquids. The novel process requires no external pressure gradient to effect extraction and has many advantages over the conventional two-phase solvent extraction.

Solvent extraction has been a useful operation in separation processes. In the operation, a liquid solvent C is used to extract a solute (or solutes) A from a second liquid B in which A is dissolved. Solvent liquids B and C are immiscible or substantially immiscible.

For a conventional operation, solvent liquids B and C are mixed directly, then separated into two phases. During the direct mixing, however, certain inherent difficulties are present. To illustrate, a foam frequently develops which has the disadvantages, for example, of reducing the mass-transfer rate and prevents a complete phase separation. To increase mass-transfer area in conventional solvent extraction, small drops have to be formed during the mixing. In such cases, the power consumption in processes involving a mixture of the liquid phases is high due to such operations such as mixer-settler, mechanically stirred column, etc. When the drops which occur during the mixing are formed, a back mixing may occur, leading to a reduction of mass-transfer rate. Also, the smaller the size of the drops, the more readily a foam is generated.

In a given stream, if the solute A is to be extracted from a mixture of solutes, the liquid solvent C, for a conventional operation, must be chosen so as to extract A selectively from other solutes in the solvent liquid B. However, sometimes the selectivity becomes difficult to establish. In addition to the limitations of the conventional solvent extraction mentioned above, solvent loss is high owing to entrainment and hold-up tanks are generally required for phase separations. The present invention, using a solvent swollen membrane system, avoids these and various other drawbacks inherent in conventional solvent extraction techniques in which the respective liquid solvents are in direct contact wih each other.

SUMMARY OF THE INVENTION

The present invention contemplates a novel membrane separation method comprising solvent extraction which is superior to conventional solvent extraction methods and which has substantial practical importance in separation technology.

In the membrane solvent extraction process in accordance with the invention, two substantially immiscible solvent liquids B and C are separated by a membrane, i.e. with no direct phase-to-phase contact between the two liquids. During the extraction, a solute (or solutes) A diffuses from the solvent liquid B into and across a solvent swollen membrane and ultimately passes into the solvent liquid C.

It is a primary object of the invention to provide a simple, efficient and economic solvent extraction process for the transfer of a solute present in a first solvent liquid to a second solvent liquid by use of a membrane and without directly intermixing the two liquids.

It is another and more specific object to provide a solvent extraction process employing a hollow fiber membrane which has a large mass transfer area per unit volume as the mechanism for selectively extracting a material from one solvent liquid medium and depositing it into a second liquid medium without requiring a direct contact of the two media.

Further objects and advantages of the present invention will become apparent from the description of the invention which follows in greater detail, wherein parts and percentages are by weight unless otherwise specified.

BRIEF DESCRIPTION OF THE DRAWING

The hollow fiber membrane solvent extraction process will be described in connection with the several figures of the drawing wherein.

DESCRIPTION OF THE PREFERRED EMBODIMENTS

Figure 1:
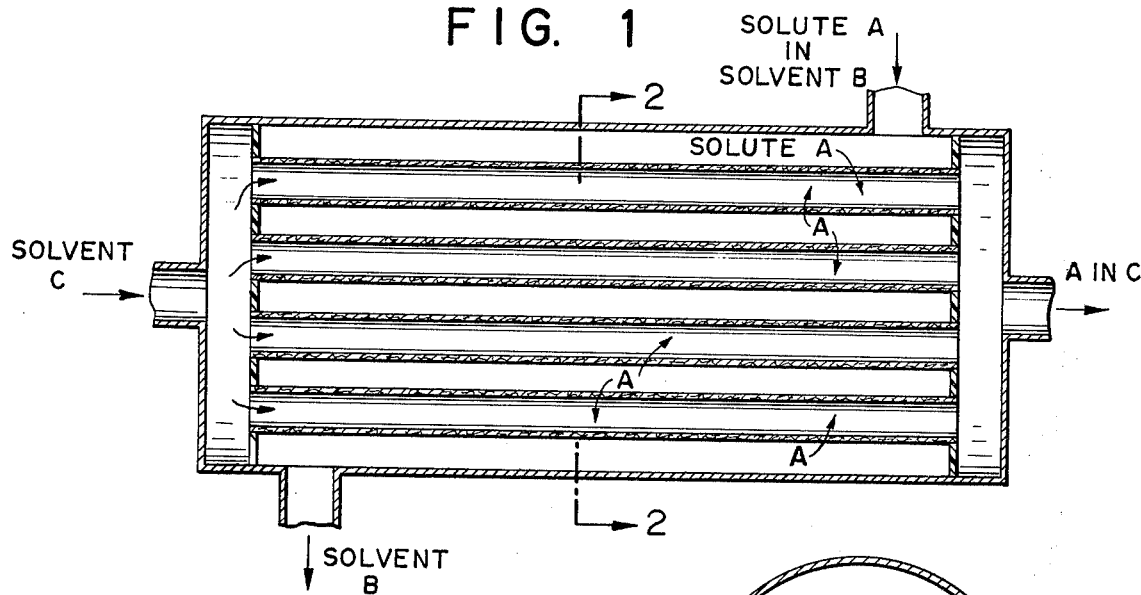
FIG. 1 depicts schematically a hollow fiber arrangement including reference to material flow for a typical extraction process.

A membrane in a form such as hollow fiber, flat sheet, tubular shape, or other shaped form can be utilized in membrane solvent extraction to prevent direct phase-to-phase mixing between the respective solvents. However, in accordance with the preferred embodiment, the invention contemplates the use of hollow fiber membrane as the mechanism for effecting separation of a component material, e.g. a solute, A from a first solvent liquid medium B and introducing said material into a second solvent liquid medium C without directly intermixing the two liquid media.

The membrane solvent-extraction according to the invention employs a substantially non-porous membrane in a swelled state to extract the solute from one solvent into another immiscible solvent. The transfer through the non-porous, solvent-swelled membrane is by diffusion, a process of mass-transfer which occurs as a movement of individual molecules. This movement of the solute in the extraction process according to the invention is induced by the partition coefficient of the solute in the two immiscible solvents. While a porous medium, i.e. a partition which has pores or channels directly through the partition permits hydrodynamic flow; such a medium is not a membrane by conventional definition (see "Diffusion and Membrane Technology" by Sidney B. Tuwiner, Reinhold Publishing Corporation, p. 1, line 16, 1962) nor within the contemplation of the present invention. The membranes utilized in the invention do not allow the direct contact of the two immiscible liquids of the extraction system. Therefore, porous membrane or partition with direct channels that permit direct contacts of the two liquids B and C are not within the membranes contemplated by the invention.

A non-porous, swelled membrane as contemplated by the invention may be viewed as a form of gel. The solvents and solute involved in the extraction all interact with the membrane to form a single phase, polycomponent system. The whole swollen membrane thus behaves as an intermediary "solvent", zone between the respective solvents B and C and as the solute is transferred from B to C it is "dissolved and passes through" this intermediate solvent membrane.

This swollen membrane or intermediate zone between solvents B and C may be viewed as a polymer solution consisting of two continuous dynamic interpenetrating phases. Accordingly, the solute diffuses through, i.e. is dissolved in the swollen membrane via this liquid part of the membrane. When the membrane composition is a polymer, the polymer chains are constantly in motion, the higher the degree of swelling, the more rapid the motion of the polymer chains will be. The solute undergoes diffusional displacement in the membrane phase.

The membrane swelling is affected by many factors; in the polymeric membranes, the swelling is dependent upon the polymer composition, the crystallinity, the degree of cross-linking, etc. The most important factor in selecting the membrane for solvent-extraction is the molecular interaction between the solute and solvent with and within the membrane. For instance, when the membrane composition includes polar groups such as nitrogen

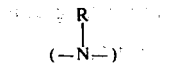

or alcohol (—OH) groups, the membrane will interact strongly with polar solvents, and will be highly swollen by water, and solutes such as phenol will be easier to extract by using such hydrophilic membranes. On the other hand, if the membrane consists of hydrocarbon chains, the membrane will be hydrophobic and will be swollen by certain organic solvents only. The degree of interaction of many polymers with various solvents is well known and can be estimated by referring to tables of solubility parameters, estimates of cohesive energy density, and the like. Thus, the choice of membrane for solvent-extraction can be varied according to the nature of the solvents B and C involved in the extraction.

It is thus seen that membranes employed in the invention, various compositions of which will be described hereinafter in greater detail must be essentially impermeable or non-porous to the direct passage of the respective solvent systems but swollen thereby. In the swollen state the membrane provides a relatively rapid conduit for the extraction; the solute diffuses through the respective swollen zones of the membrane into the extracting solvent C. The membrane employed must have a high affinity for at least one of the solvents B or C to yield a membrane with diffusivity for the solute in the range claimed. High diffusivity means the solvent has the capability to swell the polymer which swelling reduces the resistance to the mass transfer of the solute to the degree that a relatively rapid practical extraction is effected. The mechanism afforded by the swollen membrane provides the required pathways for the solute molecules to move through expeditiously. The swollen polymeric (membrane) matrix in effect is a new phase or zone distinct from the original solvent and from the original membranes and in which the solute transferring from liquid solvent B to liquid solvent C is dissolved.

Several of the advantages of the membrane solvent extraction process including the use of hollow fibers provided by the invention, hereinafter described in greater detail, may be summarized as follows.

1. The availability of a large mass-transfer area per unit volume, for example, hollow fiber membranes with O.D. 100 m, I.D. 90 m, and fiber-to-fiber separation, 20 m (see FIG. 2) give $6.7 \times 10^3$ ft$^2$ membrane area (based on O.D.) per 1 ft$^3$ volume.

2. The avoidance of a direct mixing of two phases which thereby eliminate foam generation.

3. Prevention of back mixing of the two solvent phases.

4. Superior selectively — extraction selectivity can be established through a membrane. Various components in the stream to be processed are extracted by use of different membranes in sequence.

5. High purity products.

6. Elimination of entrainment thus reducing solvent loss.

7. Elimination of hold-up tanks — no requirement for further phase separation.

8. Substantially lower power consumption.

9. Flexibility in arrangement of the processing apparatus, i.e. it may be arranged either vertically or horizontally.

As a preferred embodiment, the present invention may be effectively carried out by utilizing a continuous countercurrent solvent extraction system, as hereinafter described in greater detail. With such a solvent extraction system, the solute A may be removed economically and efficiently from the solute-bearing solutions. The extraction system can be a single stage as in FIG. 1 in which a component A initially present in solvent liquid B is removed by solvent liquid C, or a multi-stage system for extracting more than one solute separately as in FIG. 4 wherein the solutes $A_1$, $A_2$ or $A_3$ are removed in sequence by means of different selective membranes and/or different solvents. In using hollow fiber membrane configurations, the extracting solvent C may pass through the opening in the hollow fiber and extract solute A from the solute carrying solvent B through the wall of the solvent swollen hollow fiber or alternatively the solvent B may be passed through the opening in the hollow fiber.

Contacting of the hollow fiber membrane and separation of the solute from the solute-bearing solution may be effected within a wide range of operation conditions, e.g. temperatures. However, they must be selected to be practical, i.e. compatible with the over-all economic operation of the present process. For example, temperatures between freezing points of the solutions and about 200°C., preferably temperatures of 25°C. to 75°C., may be used.

The contact times of the extracting solvent on one side of the membrane with the solute-bearing solution on the other side is continued until substantial removal by diffusion through the swollen membrane into the extracting solvent has been effected.

In accordance with the preferred embodiment, recovery of the extracting solvent C is readily accomplished by distillation or other suitable methods. Accordingly, loss of solvents through usage of the present invention is minimal and thus constitutes an important economic advantage of this invention.

In membrane solvent extraction, a mass-transfer rate depends on the diffusion flux of solute A through the solvent swollen membrane between two substantially immiscible liquid solvent phases. The simplified diffusion flux can be expressed by Fick's equation as follows:

$$F = D \, (dc/dx) \qquad (1)$$

where $F$ = diffusion flux through the membrane; $D$ = diffusivity; $(dc/dx)$ = concentration gradient. A diffusivity (D) in the range of about $1 \times 10^{-8}$ to about $1 \times 10^{-4}$ cm$^2$/sec. is practically required for a given extraction system. Usually, a diffusivity higher than $10^{-7}$ cm$^2$/sec. is desirable.

In accordance with the invention, several kinds of membranes have been employed in a variety of solvent-extraction systems and yield desired results. The selection of the optimum membrane may depend on the particular environment of its use, e.g. according to the diffusivity, ie. appropriate swellability, the stability in the two liquids, and in some cases, resistance to acids and/or base. Typical membranes include, for example, Kynar[1]-PSSA[2] interpolymer, cellulose, BAMP[3]-nylon, NTA[4]-nylon, nylon membranes and composite membranes. These systems may be used with a wide variety of extraction systems of the kind listed in the form A/B/C, wherein A is a solute or solutes; and B and C are two substantially immiscible liquids and wherein C is used as a liquid solvent to extract A from the other liquid solvent B in which A is dissolved, or vice versa which the exchange of liquid solvents B and C. Illustrative systems of this kind include the following in the order to A/B/C respectively, for example.

1. ε-caprolactam/aqueous H$_2$SO$_4$ solution/CHCl$_3$
2. ε-caprolactam/H$_2$O/CHCl$_3$
3. C$_2$H$_4$Cl$_2$/H$_2$O/n-heptane
4. dinitrotoluene/H$_2$O/toluene
5. phenol/H$_2$O/toluene
6. toluene diamine/H$_2$O/dinitrotoluene
7. furfural/H$_2$O/toluene 1. polyvinylidene fluoride
2. polystyrene sulfonic acid
3. polyl[1,7(4-methyl)azaheptaneadipamide]
4. poly[1,ω-alkylene(2,6-diketopiperazine)1,4-dicarboxamide]

Figure 2:
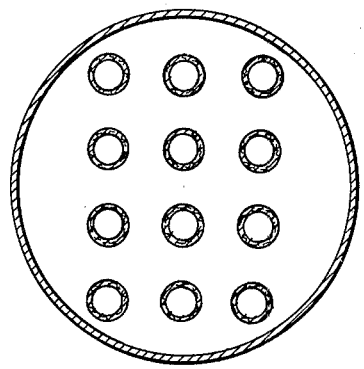
FIG. 2 is a cross-sectional schematic view of a hollow fiber arrangement of the kind shown in FIG. 1.
Figure 3:
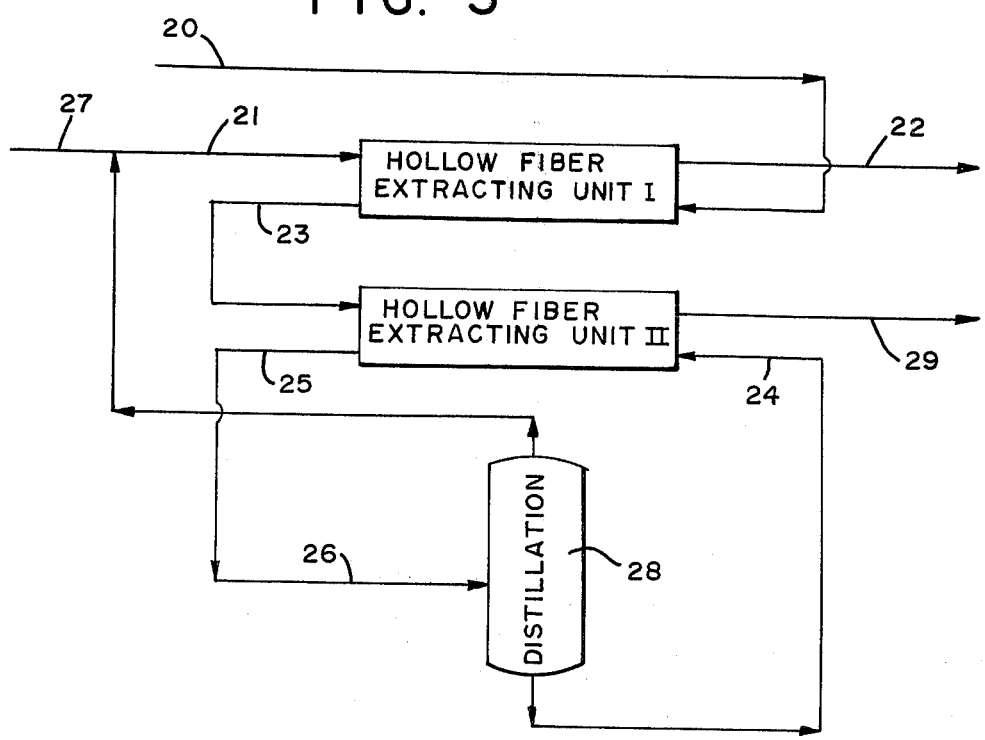
FIG. 3 is a typical flow diagram of an extraction process employing the hollow fiber mechanism of the invention.

Referring to the drawings, FIGS. 1 and 2 illustrate a chamber or housing in which hollow fiber membrane is suitably contained so that a solvent C passes only through the hollow fiber while solvent B containing the solute A contacts the outer walls only of the hollow fiber. A flow diagram for a typical extraction process employing the hollow fiber mechanism of the invention is illustrated in FIG. 3. In this flow diagram, an inlet stream 20 is fed to the extraction process, e.g. at a flow rate of 3700 lb/hr containing 0.35% dinitrotoluene (3500 ppm) in water. For example, the stream 20 may comprise a pollution stream from the production of dinitrotoluene and is introduced into the hollow-fiber extracting unit I where the dinitrotoluene in stream 20 is extracted substantially into the organic solvent stream 21 which comprises toluene at a flow rate in this instance of about 75 lb/hr. The input stream 21 is withdrawn from the extracting unit as stream 22 having a flow rate of 86.4 lb/hr. containing dinitrotoluene with a concentration of 15%, and may be further processed as a recovery stream which is sent to toluene nitrator for processing. The aqueous stream 23 resulting from the after extraction, has a flow rate of 3700 lb/hr. containing dinitrotoluene with a concentration of 2.5 ppm and toluene with a concentration of 450 ppm. The trace amount of toluene in stream 23 may be further extracted through a hollow-fiber extracting unit II, or treated by other means. The organic solvent stream 24 in the extractor is an n-alkane with a large number of carbon atoms such as n-decane which has a negligibly small solubility in water. Through hollow-fiber extracting unit II, the toluene in stream 23 is extracted by stream 24 which has a flow rate of about 9.4 lb/hr. After the extraction, stream 25 issuing from extracting unit II has a flow rate of 11.1 lb/hr. with concentration of toluene in the stream of 15%. The organic solvent, n-alkane, in stream 25 is recovered through distillation to provide the stream 24 which is recycled to hollow-fiber extracting unit II. A toluene stream 26 with a flow rate of 1.7 lb/hr. is removed from the distillation tower 28 and combined with a make-up toluene stream 27 with a flow rate of 73.5 lb/hr. to become stream 21. After hollow-fiber extracting unit II, stream 23 becomes aqueous stream 29 which contains dinitrotoluene with a concentration of 2.5 ppm or less and toluene 2.5 ppm. The total amount of organic pollutants in 29 is about 5 ppm and stream 29 may be recycled back for re-use. It is seen that the extraction process employing the hollow fiber solvent extraction mechanism is not only a recovery process, but also a pollution control process. For this extraction process, solute A is dinitrotoluene, liquid B is H$_2$O and liquid C is toluene in hollow-fiber extracting unit I; and A is toluene, B is H$_2$O and C is n-alkane in hollow-fiber extracting unit II.

Figure 4:
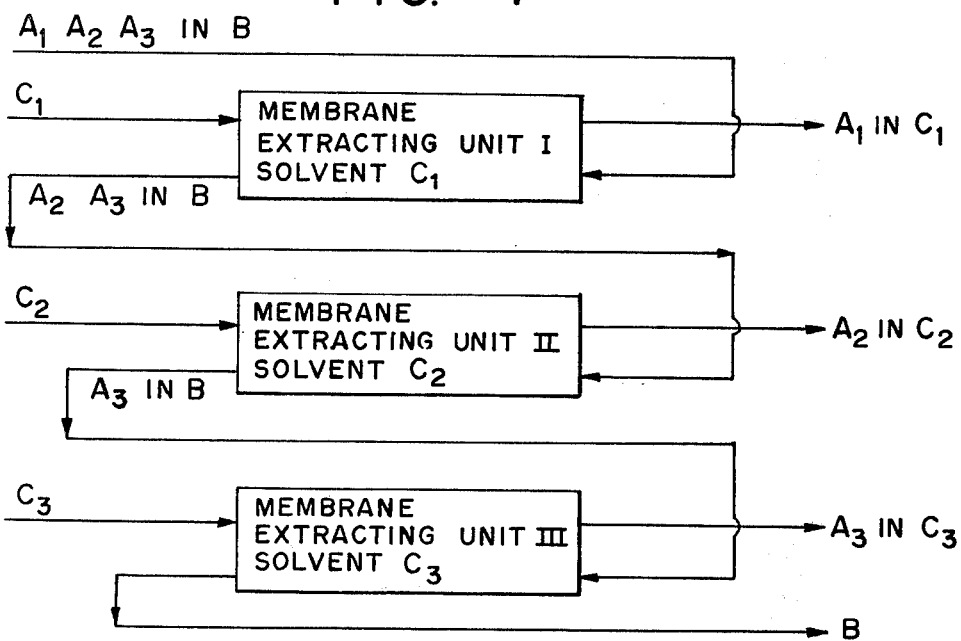
FIG. 4 illustrates a system comprising an arrangement of multi-stage membrane extracting units where different solutes are extracted in sequence.
Figure 5:
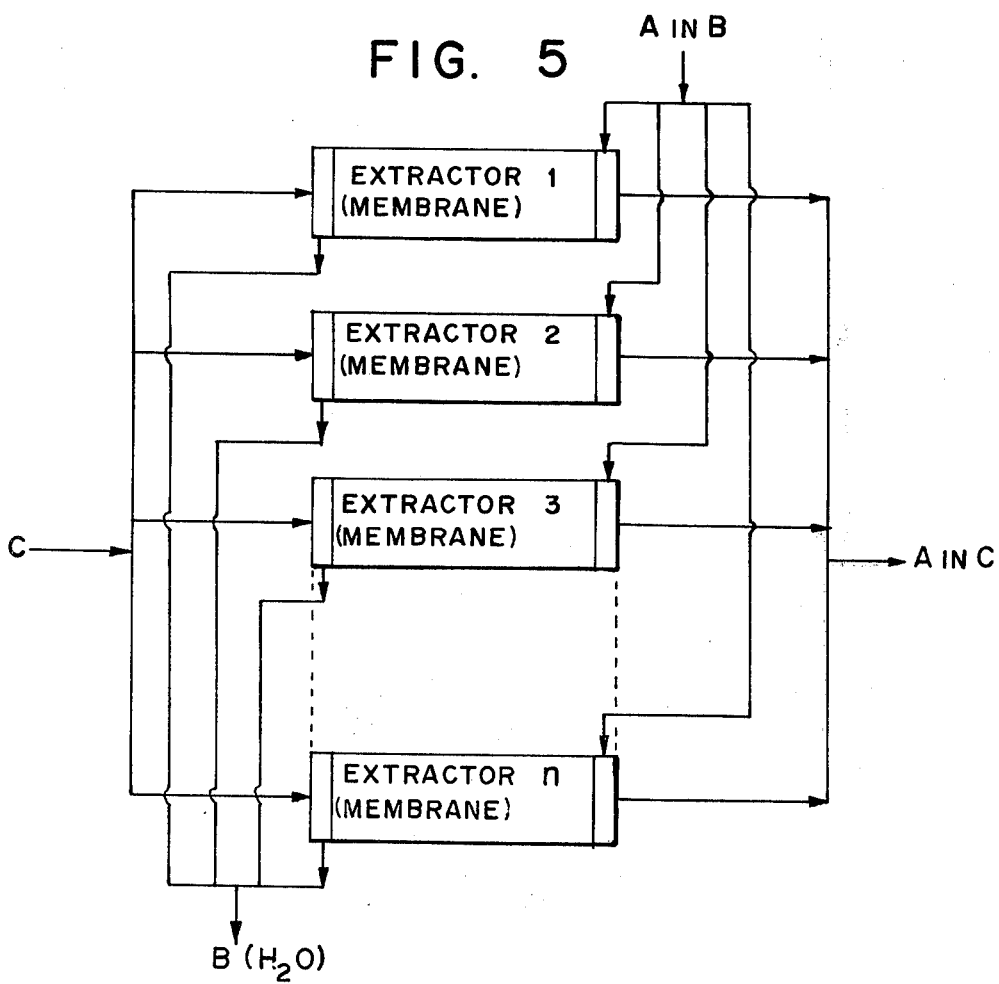
FIG. 5 shows an arrangement utilizing a plurality of membrane extractors in a membrane extracting unit.

In a case where it is desired to separate multiple solutes from a stream, an extracting process employing multi-staged membrane extracting units may be used. An arrangement of multi-staged membrane extracting units, for example, the case of three-membrane extracting units, is shown in FIG. 4. In the diagram, a stream with three solutes A$_1$, A$_2$, and A$_3$ in liquid B is extracted with a second liquid C$_1$ which is substantially immiscible with B through membrane extracting unit I. The extracting unit is characterized with a selectivity which passes A$_1$ only, but rejects A$_2$ and A$_3$. Then, after the first extraction, A$_1$ is extracted into C$_1$ whereas A$_2$ and A$_3$ are still in B. The stream of B with A$_2$ and A$_3$ is extracted again in membrane extracting unit II through a liquid C$_2$ which is substantially immiscible with B. Membrane extracting unit II has a selectivity to pass A$_2$ only and to reject A$_3$. Then, A$_2$ is extracted into C$_2$ and A$_3$ is still in B after the second extraction. The stream of B with A$_3$ is further extracted in membrane extracting unit III with a liquid C$_3$. Liquid C$_3$ is substantially immiscible with B. Then, A$_3$ is extracted into C$_3$. The solutes A$_1$, A$_2$ and A$_3$ may be different in molecular size or chemical structure. The liquids C$_1$, C$_2$ and C$_3$ may be the same as an organic solvent or different as three organic solvents.

The following examples are provided as illustrative of the present invention. The enumeration of details, however, is not to be considered as restrictive of the scope of the invention. The compositions of membranes identified by number in the Examples are identified in Table I.

Example 1

A diffusion cell with two compartments was employed to conduct the membrane solvent extraction. A non-porous membrane was mounted between the two compartments. Liquid B with solute A was introduced into one of the compartments, while liquid C was poured into the other compartment. Solute A was extracted by diffusion from liquid B, across the swelled membrane, and into liquid C. In this example, membrane 1 with a thickness of $4.58 \times 10^{-3}$ cm was used. The membrane diffusion area was 20.78 cm². Solute A was ε-caprolactam. Liquid B was 30% $H_2SO_4$. Liquid C was $CHCl_3$. Initially, the phase volume of liquid B was 362 ml and that of liquid C was 362 ml; the amount of solute A in liquid B was 109.6 gm and that in liquid C was 0. At the diffusion time of $9.24 \times 10^4$ sec., the concentration of A in B as determined was 0.226 gm/ml and that in C was 0.109 gm/ml; the amount of A in liquid C increased to 36.2 gm. The diffusivity of $4.4 \times 10^{-7}$ cm²/sec. was obtained. The temperature and the pressure were ambient.

Example 2

The extraction was conducted following the same procedure as in Example 1. Membrane 2 with a thickness of $3.78 \times 10^{-3}$ cm was used. The membrane diffusion area was 20.78 cm². Solute A was ε-caprolactam; Liquid B was $H_2O$. Liquid C was $CHCl_3$. Initially, the phase volume of B was 300 ml and that of C was 300 ml; the amount of A in B was 60 gm and that in C was 0. At a diffusion time of $1.44 \times 10^4$ sec., the concentration of A in B as determined was 0.185 gm/ml and that in C was 0.0178 gm/ml; the amount of A in C increased to 5.44 gm. A diffusivity of $3.6 \times 10^{-7}$ cm²/sec. was obtained. The temperature and the pressure were ambient.

Example 3

The extraction experiment was conducted following the procedure of Example 1. Membrane 3 with a thickness of $1.83 \times 10^{-2}$ cm was used. The membrane diffusion area was 16.75 cm². Solute A was ε-caprolactam. Liquid B was $H_2O$. Liquid C was $CHCl_3$. Initially, the phase volume of B was 297.5 ml and that of C was 296 ml; the amount of A in B was 80.4 gm and that in C was 0. At a diffusion time of $1.41 \times 10^5$ sec., the concentration of A in B as determined was 0.270 gm/ml and that in C was 0.00261 gm/ml; the amount of A in C increased to 0.767 gm. A diffusivity of $2.9 \times 10^{-8}$ cm²/sec. was obtained. The temperature and the pressure were ambient.

Example 4

The extraction experiment was conducted following the procedure of Example 1. Membrane 4 with a thickness of $1.64 \times 10^{-2}$ cm was used. The membrane diffusion area was 16.75 cm². Solute A was ε-caprolactam; Liquid B was $H_2O$. Liquid C was $CHCl_3$. Initially, the phase volume of B was 300 ml and that of C was 295.5 ml; the amount of A in B was 81.8 gm and that in C was 0. At a diffusion time of $8.16 \times 10^4$ sec., the concentration of A in B as determined was 0.261 gm/ml and that in C was 0.0182 gm/ml; the amount of A in C increased to 5.38 gm. A diffusivity of $2.4 \times 10^{-7}$ cm²/sec. was obtained. The temperature and the pressure were ambient.

Example 5

The extraction experiment was conducted following the procedure of Example 1. Membrane 5 with a thickness of $9.22 \times 10^{-3}$ cm was used. The membrane diffusion area was 16.75 cm². Solute A was ε-caprolactam; Liquid B was $H_2O$. Liquid C was $CHCl_3$. Initially, the phase volume of B was 296 ml and that of C was 296 ml; the amount of A in B was 80 gm and that in C was 0. At a diffusion time of $7.05 \times 10^4$ sec., the concentration of A in B as determined was 0.197 gm/ml and that in C was 0.0851 gm/ml; the amount of A in C increased to 26.54 gm. A diffusivity of $9.22 \times 10^{-7}$ cm²/sec. was obtained. The temperature and the pressure were ambient.

Example 6

The extraction experiment was conducted following the procedure of Example 1. Membrane 6 with a thickness of $2.48 \times 10^{-2}$ cm was used. The membrane diffusion area was 20.78 cm². Solute A was ε-caprolactam; Liquid B was $H_2O$. Liquid C was $CHCl_3$. Initially, the phase volume of B was 297.5 ml and that of C was 301 ml; the amount of A in B was 80.4 gm and that in C was 0. At a diffusion time of $1.73 \times 10^5$ sec., the concentration of A in B as determined was 0.259 gm/ml and that in C was 0.0142 gm/ml; the amount of A in C increased to 4.23 gm. A diffusivity of $1.11 \times 10^{-7}$ cm²/sec. was obtained. The temperature and the pressure were ambient.

Example 7

The extraction experiment was conducted following the procedure of Example 1. Membrane 7 with a thickness of $2.01 \times 10^{-2}$ cm was used. The membrane diffusion area was 20.78 cm². Solute A was ε-caprolactam; Liquid B was $H_2O$. Liquid C was $CHCl_3$. Initially, the phase volume of B was 296 ml and that of C was 294.5 ml; the amount of A in B was 80 gm and that in C was 0. At a diffusion time of $1.68 \times 10^5$ sec., the concentration of A in B as determined was 0.248 gm/ml and that in C was 0.028 gm/ml; the amount of A in C increased to 8.32 gm. A diffusivity of $1.87 \times 10^{-7}$ cm²/sec. was obtained. The temperature and the pressure were ambient.

Example 8

The extraction experiment was conducted following the procedure of Example 1. Membrane 8 with a thickness of $2.26 \times 10^{-2}$ cm was used. The membrane diffusion area was 20.78 cm². Solute A was ε-caprolactam; Liquid B was $H_2O$. Liquid C was $CHCl_3$. Initially, the phase volume of B was 289 ml and that of C was 303 ml; the amount of A in B was 78.1 gm and that in C was 0. At a diffusion time of $1.13 \times 10^5$ sec., the concentration of A in B as determined was 0.25 gm/ml and that in C was 0.0285 gm/ml; the amount of A in C increased to 8.39 gm. A diffusivity of $3.13 \times 10^{-7}$ cm²/sec. was obtained. The temperature and the pressure were ambient.

Example 9

The extraction experiment was conducted following the procedure of Example 1. A Membrane of the composition of Example 1 with a thickness of $7.9 \times 10^{-3}$ cm was used. The membrane diffusion area was 16.75 cm². Solute A was ε-caprolactam; Liquid B was $H_2O$. Liquid C was $CHCl_3$. Initially, the phase volume of B was 299.5 ml and that of C was 295 ml; the amount of A in B was 81 gm and that in C was 0. At a diffusion time of $7.63 \times 10^4$ sec., the concentration of A in B as determined was 0.21 gm/ml and that in C was 0.0692 gm/ml; the amount of A in C increased to 21.2 gm. A diffusivity of $5.6 \times 10^{-7}$ cm²/sec. was obtained. The temperature and the pressure were ambient.

Example 10

The extraction experiment was conducted following the procedure of Example 1. Membrane 9 with a thickness of $1.37 \times 10^{-2}$ cm was used. The membrane diffusion area was 20.78 cm². Solute A was ε-caprolactam; Liquid B was $H_2O$. Liquid C was $CHCl_3$. Initially, the phase volume of B was 333 ml and that of C was 330 ml; the amount of A in B was 90 gm and that in C was 0. At a diffusion time of $8.4 \times 10^4$ sec., the concentration of A in B as determined was 0.225 gm/ml and that in C was 0.0755 gm/ml; the amount of A in C increased to 21 gm. A diffusivity of $8.83 \times 10^{-7}$ cm²/sec. was obtained. The temperature and the pressure were ambient.

Example 11

The extraction experiment was conducted following the procedure of Example 1. The membrane of Example 6 was used. The membrane diffusion area was 20.78 cm². Solute A was 1,2-dichloroethane ($C_2H_4Cl_2$). Liquid B was $H_2O$. Liquid C was n-heptane. Initially, phase volume of B was 292.5 ml and that of C was 292.5 ml; the amount of A in B was 2.07 gm and that in C was 0. At a diffusion time of $2.43 \times 10^5$ sec., the concentration of A in B as determined was 0.0053 gm/ml and that in C was 0.00178 gm/ml; the amount of A in C increased to 0.52 gm. A diffusivity of $4.22 \times 10^{-7}$ cm²/sec. was obtained. The temperature and the pressure were ambient.

Example 12

The extraction experiment was conducted following the procedure of Example 1. The membrane of Example 7 was used. The membrane diffusion area was 20.78 cm². Solute A was 1,2-dichloroethane ($C_2H_4Cl_2$). Liquid B was $H_2O$. Liquid C was n-heptane. Initially, the phase volume of B was 295.5 ml and that of C was 291.5 ml; the amount of A in B was 2.09 gm and that in C was 0. At a diffusion time of $2.51 \times 10^5$ sec., the concentration of A in B as determined was 0.00404 gm/ml and that in C was 0.00309 gm/ml; the amount of A in C increased to 0.9 gm. A diffusivity of $6.47 \times 10^{-7}$ cm²/sec. was obtained. The temperature and the pressure were ambient.

Example 13

The extraction experiment was conducted following the procedure of Example 1. A membrane of the composition and thickness of Example 9 was used. The membrane diffusion area was 16.75 cm². Solute A was 1,2-dichloroethane ($C_2H_4Cl_2$). Liquid B was $H_2O$. Liquid C was n-heptane. Initially, the phase volume of B was 302.5 ml and that of C was 296 ml; the amount of A in B was 2.14 gm and that in C was 0. At the diffusion time of $8.95 \times 10^4$ sec., the concentration of A in B as determined was 0.00506 gm/ml and that in C was 0.00206 gm/ml; the amount of A in C increased to 0.61 gm. The diffusivity of $5.37 \times 10^{-7}$ cm²/sec. was obtained. The temperature and the pressure were ambient.

Example 14

The extraction experiment was conducted following the procedure of Example 1. The membrane of Example 6 was used. The membrane diffusion area was 20.78 cm². Solute A was a mixture of 2,4-dinitrotoluene and 2,6-dinitrotoluene. Liquid B was toluene. Liquid C was $H_2O$. Initially, the phase volume of B was 285 ml and that of C was 296 ml; the amount of A in B was 56.8 gm and that in C was 0. At a diffusion time of $1.67 \times 10^5$ sec., the concentration of A in B as determined was 0.199 gm/ml and that in C was $22.3 \times 10^{-6}$ gm/ml; the amount of A in C increased to 0.0066 gm. A diffusivity of $3.16 \times 10^{-7}$ cm²/sec. was obtained. The temperature and the pressure were ambient.

Example 15

The extraction experiment was conducted following the procedure of Example 1. A membrane of the composition of Example 7 with a thickness of $2.03 \times 10^{-2}$ cm was used. The membrane diffusion area was 20.78 cm². Solute A was a mixture of 2,4-dinitrotoluene and 2,6-dinitrotoluene. Liquid B was toluene. Liquid C was $H_2O$. Initially, the phase volume of B was 301 ml and that of C was 298.5 ml; the amount of A in B was 60 gm and that in C was 0. At a diffusion time of $1.73 \times 10^5$ sec., the concentration of A in B as determined was 0.199 gm/ml and that in C was $44.8 \times 10^{-6}$ gm/ml; the amount of A in C increased to 0.0134 gm. A diffusivity of $6.06 \times 10^{-7}$ cm²/sec. was obtained. The temperature and the pressure were ambient.

Example 16

The extraction experiment was conducted following the procedure of Example 1. A membrane of the composition and thickness of Example 9 was used. The membrane diffusion areas was 16.75 cm². Solute A was a mixture of 2,4-dinitrotoluene and 2,6-dinitrotoluene. Liquid B was toluene. Liquid C was $H_2O$. Initially, the phase volume of B was 293 ml and that of C was 298 ml; the amount of A in B was 58.4 gm and that in C was 0. At the diffusion time of $7.85 \times 10^4$ sec., the concentration of A in B as determined was 0.199 gm/ml and that in C was $27.3 \times 10^{-6}$ gm/ml; the amount of A in C increased to 0.00814 gm. The diffusivity of $5 \times 10^{-7}$ cm²/sec. was obtained. The temperature and the pressure were ambient.

Example 17

The extraction experiment was conducted following the procedure of Example 1. Membrane 10 with a thickness of $1.88 \times 10^{-2}$ cm was used. The membrane diffusion area was 20.78 cm². Solute A was a mixture of 2,4-dinitrotoluene and 2,6-dinitrotoluene. Liquid B was toluene. Liquid C was $H_2O$. Initially, the phase volume of B was 293 ml and that of C was 300.5 ml; the amount of A in B was 58.4 gm and that in C was 0. At a diffusion time of $1.03 \times 10^5$ sec., the concentration of A in B as determined was 0.199 gm/ml and that in C was $24.3 \times 10^{-6}$ gm/ml; the amount of A in C increased to 0.0073 gm. A diffusivity of $6.4 \times 10^{-7}$ cm²/sec. was obtained. The temperature and the pressure were ambient.

Example 18

The extraction experiment was conducted following the procedure of Example 1. The membrane of the composition and thickness of Example 9 was used. The membrane diffusion area was 16.75 cm². Solute A was phenol. Liquid B was $H_2O$. Liquid C was toluene. Initially, the phase volume of B was 295 ml and that of C was 291 ml; the amount of A in B was 11 gm and that in C was 0. At a diffusion time of $8.04 \times 10^4$ sec., the concentration of A in B as determined was 0.0235 gm/ml and that in C was 0.0141 gm/ml; the amount of A in C increased to 4.08 gm. A diffusivity of $9.7 \times 10^{-7}$ cm$^2$/sec. was obtained. The temperature and the pressure were ambient.

Example 19

The extraction experiment was conducted following the procedure of Example 1. Membrane 11 with a thickness of $1.3 \times 10^{-2}$ cm was used. The membrane diffusion area was 16.75 cm$^2$. Solute A was a mixture of 2,4- and 2,6-toluene diamines. Liquid B was H$_2$O. Liquid C was a mixture of 2,4-dinitrotoluene and 2,6-dinitrotoluene at 70°C. Initially, the phase volume of B was 291 ml and that of C was 290 ml; the amount of A in B was 291 gm and that in C was 0. At a diffusion time of $1.81 \times 10^5$ sec., the concentration of A in B as determined was 0.00457 gm/ml and that in C was 0.00545 gm/ml; the amount of A in C increased to 1.58 gm. A diffusivity of $1.06 \times 10^{-6}$ cm$^2$/sec. was obtained. The temperature was 70°C. and the pressure was ambient.

Example 20

The extraction experiment was conducted following the procedure of Example 1. Membrane 7 with a thickness of $2.03 \times 10^{-2}$ cm was used. The membrane diffusion area was 20.78 cm$^2$. Solute A was toluene diamine. Liquid B was H$_2$O. Liquid C was a mixture of 2,4-dinitrotoluene and 2,6-dinitrotoluene at 70°C. Initially, the phase volume of B was 290 ml and that of C was 290 ml; the amount of A in B was 2.9 gm and that in C was 0. At a diffusion time of $1.77 \times 10^5$ sec., the concentration of A in B as determined was 0.00334 gm/ml and that in C was 0.00666 gm/ml; the amount of A in C increased to 1.93 gm. A diffusivity of $2.05 \times 10^{-6}$ cm$^2$/sec. was obtained. The temperature was 70°C. and the pressure was ambient.

Example 21

An experiment of counter-current membrane solvent extraction was carried out with a hollow fiber extractor of Membrane 12. The outside diameter, the inside diameter and the effective length of the extractor were 5.1 cm, 4.6 cm, and 12.7 cm, respectively. The extractor consisted of $1.26 \times 10^4$ hollow fibers with the dimensions O.D. 230 μm and I.D. 180 μm. Solute A was furfural. Liquid B was H$_2$O. Liquid C was toluene. During the hollow fiber solvent extraction, the extractor was layed out horizontally. Liquid phase B with a flow rate of 0.948 gm/sec. was pumped into the extractor outside the hollow fibers whereas liquid phase C with a flow rate of 0.828 gm/sec. inside the hollow fibers. The inlet concentrations of A in B was 5.02% whereas the outlet concentration was 1.14%. The inlet concentration of A in C was 0 whereas the outlet concentration was 4.41%. The diffusivity of $1.78 \times 10^{-7}$ cm$^2$/sec. was obtained. The temperature and the pressure were ambient.

The foregoing as well as other membrane systems are set forth in Table I with their respective diffusivities.

Besides the membranes with specific compositions mentioned above, the same types of membranes with different compositions and the membranes such as cellulose derivatives, polyethylene, polypropylene, polystyrene and others can also be used in membrane solvent extraction.

TABLE I

Diffusivities in Membrane Solvent Extraction

| Example No. | Membrane Solvent Extraction System | No. of Membrane Employed | Membrane Composition | Membrane Prep. | Diffusivity (cm$^2$/sec) |
|---|---|---|---|---|---|
| 1 | ε-caprolactam/ H$_2$SO$_4$ aqueous solution/CHCl$_3$ | 1 | 27% Kynar 54% PSSA* 19% epoxide-novolac | cast | $4.4 \times 10^{-7}$ |
| 2 | ε-caprolactam/ H$_3$ | 2 | cellulose | | $3.6 \times 10^{-7}$ |
| 3 | ε-caprolactam/ H$_2$O/CHCl$_3$ | 3 | 60% BAMPΔ 40% Nylon | melt | $2.9 \times 10^{-8}$ |
| 4 | " | 4 | " | cast | $2.4 \times 10^{-7}$ |
| 5 | " | 5 | 40% BAMP 50% Nylon 10% Lauryl lactam | cast | $9.2 \times 10^{-7}$ |
| 6 | " | 6 | " | melt | $1.11 \times 10^{-7}$ |
| 7 | " | 7 | 40% BAMP 40% Nylon 15% Lauryl lactam 5% LiCl | melt | $1.87 \times 10^{-7}$ |
| 8 | " | 8 | 37.5% BAMP 37.5% Nylon 20% Lauryl lactam 5% LiCl | melt | $3.13 \times 10^{-7}$ |
| 9 | " | 1 | 27% Kynar 54% PSSA 19% Epoxide-novolac | cast | $5.6 \times 10^{-7}$ |
| 10 | " | 9 | 20% NTA$^+$ 80% Nylon | cast | $8.83 \times 10^{-7}$ |
| 11 | C$_2$H$_4$Cl$_2$ H$_2$O n-heptane | 6 | 40% BAMP 50% Nylon 10% Lauryl lactam | melt | $4.22 \times 10^{-7}$ |
| 12 | " | 7 | 40% BAMP 40% Nylon 15% Lauryl lactam 5% LiCl | melt | $6.47 \times 10^{-7}$ |

TABLE I-continued
Diffusivities in Membrane Solvent Extraction

| Example No. | Membrane Solvent Extraction System | No. of Membrane Employed | Membrane Composition | Membrane Prep. | Diffusivity (cm²/sec) |
|---|---|---|---|---|---|
| 13 | $C_2H_4Cl_2$/ $H_2O$/n-heptane | 1 | 27% Kynar<br>54% PSSA<br>19% Epoxide-novolac | cast | $5.37 \times 10^{-7}$ |
| 14 | Dinitrotoluene/ $H_2O$/toluene | 6 | 40% BAMP<br>50% Nylon<br>10% Lauryl lactam | melt | $3.16 \times 10^{-7}$ |
| 15 | " | 7 | 40% BAMP<br>40% Nylon<br>15% Lauryl lactam<br>5% LiCl | melt | $6.06 \times 10^{-7}$ |
| 16 | " | 1 | 27% Kynar<br>54% PSSA<br>19% Epoxide-novolac | cast | $5 \times 10^{-7}$ |
| 17 | " | 10 | 60% Nylon<br>40% Lauryl lactam | melt | $6.4 \times 10^{-7}$ |
| 18 | °Phenol/$H_2O$/toluene | 1 | 27% Kynar<br>54% PSSA<br>19% Lauryl lactam | cast | $9.7 \times 10^{-7}$ |
| 19 | Toluene Diamine/ $H_2O$/dinitro-toluene | 11 | 90% Poly-styrene with 39% functionalized with —$SO_3H$<br>10% Epoxide-novolac | cast | $1.06 \times 10^{-6}$ |
| 20 | " | 7 | 40% BAMP<br>40% Nylon<br>15% Lauryl lactam<br>5% LiCl | melt | $2.05 \times 10^{-6}$ |
| 21 | Furfural/$H_2O$/toluene | 12 | cellulose hollow fiber | | $1.78 \times 10^{-7}$ |

*PSSA = polystyrene sulfonic acid
ΔBAMP = poly [1,7(4-methyl)azaheptanadipamide]
+NTA = nitrilotriacetic acid
°= In lieu of toluene a long chain amine having a carbon chain of from 4 to 30 carbon atoms may be employed or a mixture of these amines or a solution of said amine in toluene.

The membrane solvent extraction process of the invention in addition to the foregoing examples may also be applied to the following systems which are further illustrative but not limiting. These systems are listed with three columns, A, B and C in Table II. As noted previously, A is a solute or solutes; and B and C are two substantially immiscible liquids. C is used as a liquid solvent to extract A from the other liquid B in which A is dissolved, or vice versa with the exchange of B and C. The non-porous membrane employed for any given system may be readily selected by those skilled in the art in accordance with the teaching provided herein so as to be swollen by the respective solvents involved in the extraction and thereby providing a suitable diffusion mechanism or intermediary transition dispersing phase for the relatively rapid transfer of solute A from the solvent B into the extracting solvent C.

TABLE II

| System No. | (A) Solute | (B) Liq. Cont. Solute | (C) Extracting Liquid |
|---|---|---|---|
| a | toluene diamine | $H_2O$ | dichlorobenzene |
| b | toluene diamine | " | toluene, or benzene or xylene |
| c | ε-caprolactam | aqueous $H_2SO_4$ | $C_2H_2Cl_4$ |
| d | ε-caprolactam | $H_2O$ | $C_2H_2Cl_4$, or ethers, or toluene or benzene |
| e | $C_2H_4Cl_2$ | " | liquid alkanes or aliphatic hydrocarbons |
| f | dinitrotoluene | " | dichlorobenzene or benzene or xylene |
| g | phenol | " | benzene, or dichlorobenzene, or xylene, or naphthapyridine or naphtha-quinoline |
| h | toluene, or dichlorobenzene, or benzene, or xylene, or | " | liquid alkanes, or aliphatic hydrocarbons |

TABLE II-continued

| System No. | (A) Solute | (B) Liq. Cont. Solute | (C) Extracting Liquid |
|---|---|---|---|
| | others | | |
| i | nitrobenzene, or nitrophenols, or nitrocresols | " | toluene, or benzene, or xylene, or dichlorobenzene |
| j | $C_2H_2Cl_4$, or $C_2Cl_3F_3$, or $CCl_3F$, or $C_2Cl_4F_2$, or $C_2H_4 I_2$ | " | liquid alkanes or aliphatic hydrocarbons |
| k | aromatic hydrocarbons | kerosene | liquid $SO_2$, or mixture of liquid $SO_2$ and benzene |
| l | aromatic hydrocarbons | kerosene | diethyl glycol |
| m | aromatic hydrocarbons | kerosene | sulfolane |
| n | 1,3-butadiene | other $C_4$-hydrocarbons | ammoniacal cuprous acetate solution |
| o | mercaptans | gasoline | aqueous NaOH, or KOH-potassium isobutyrate, or NaOH-methanol |
| p | aromatic hydrocarbons | parafinnic and/or naphthenic hydrocarbons | aniline, or furfural- or liquid $SO_2$-benzene or $\beta,\beta$-dichloroethyl ether, or nitrobenzene |
| q | asphalt | lubricating oil | liquid propane |
| r | color bodies | vegetable oils | liquid propane |
| s | unsaturated glycerides | vegetable oils | furfural, or nitro-paraffins, or sulfur dioxide or sulfolanes |
| t | glycerol | fat, or oil | $H_2O$ |
| u | penicillin | fermentation broth | amyl acetate, or $CHCl_3$, or ethyl acetate, or ethyl ether, or cyclohexanone, or dioxane, or ethylene dichloride, or furfuryl acetate, or methyl isobutyl ketone |
| v | $CH_3COOH$ | demethanolized pyroligneous liquors resulting from the destructive distillaton of wood or solutions of the cellulose acetate industries | ethyl ether, or isopropyl ether, or ethyl acetate, or isopropyl ether-ethyl acetate, or tertiary aliphatic amine-liquid alkanes, or tertiary amine-xylene or xylene |
| w | glycerol | $H_2O$ | xylene, or isooctane |
| x | aniline | $H_2O$ | benzene, or toluene, or xylene, or dichlorobenzene |
| y | bi-phenyl-acetyl carbinol | yeast fermentation of benzaldehyde | ethyl ether, or ethers, or ethyl acetate |
| z | quinine | naphtha solution | acid solution |
| a' | ergonovine | $H_2O$ | ethyl ether, or other ethers |
| b' | ethyl malonate | $H_2O$ | benzene, or toluene |
| c' | ethanol | ethyl acetate | $H_2O$ |
| d' | butanol | butyl acetate | $H_2O$ |
| e' | nitric acid | nitroparaffins | $H_2O$ |
| f' | sodium sulfite | $\beta$-naphthol | $H_2O$ |
| g' | carboxylic acids | $H_2O$ | liquid alkanes, or benzene, or toluene |
| h' | pesticides, or herbicides | " | liquid alkanes, or chlorobenzene, or benzene, or toluene |
| i' | acrylic acid | " | liquid alkanes, or benzene, or toluene, or ethers |
| j' | cyclohexanol, or cyclohexanone | " | cyclohexane |
| k' | aromatics | paraffins | furfural-furfuryl alcohol-water mixtures, or aqueous tetrahydrofuryl alcohol, or aqueous dimethyl formamide |
| l' | esters | $H_2O$ | isopropyl ether, or other ethers |
| m' | strychnine, or brucine | naphtha solution | acid solution |
| n' | eugenol | oil of cloves | dilute caustic soda |
| o' | pyrethrum | aqueous methanol | light hydrocarbon |
| p' | lactic acid | $H_2O$ | isopropyl ether, or other ethers, or ether-alcohol mixture |

TABLE II-continued

| System No. | (A) Solute | (B) Liq. Cont. Solute | (C) Extracting Liquid |
|---|---|---|---|
| q' | chloronitro-benzenes | " | liquid alkanes, or toluene, or xylene, or dichlorobenzene |
| r' | fatty acids | crude grease | alcohols |
| s' | $H_3PO_4$ | $H_2O$ | alochols with four or five carbon atoms, or isopropyl ehter |
| t' | HF | $H_2O$ | alcohols with four or five carbon atoms, or isopropyl ether, or secondary or tertiary amine in $CHCl_3$ or xylene, or benzene solution |
| u' | bromine | brine containing bromine | tetrabromoethane |
| v' | $H_2O$ | raw water with impurities | secondary, or tertiary amines |
| w' | $H_2SO_4$ | $H_2O$ | tri-n-octylaminebenzene solution |
| x' | $HNO_3$ | " | tertiary aliphatic amine solution |
| y' | HCl | " | secondary or tertiary amine in $CHCl_3$ or xylene or benzene solution |
| z' | benzoic acid | " | benzene, or toluene, or kerosene |
| a" | amines | " | benzene, or toluene |
| b" | acetone, or acetaldehyde | " | vinyl acetate, or xylene, or benzene, or toluene |
| c" | propionic acid | " | ketones, or ethers, or alcohols |
| d" | pentaerylthritol | " | ketones, or ethers, or alcohols, or benzene, or xylene |

The distinct nature of the invention is further emphasized by reference to the following table wherein the "function" of the membrane and "extraction mechanism" of this invention is compared with other systems. Included in this comparison is the difference between a membrane extraction as contemplated by the invention and the extraction with a perforated partition or porous wall.

The application of membrane solvent extraction in accordance with the teaching of this invention is not limited to the systems enumerated above in the examples and Tables I and II. It may be applied as will be apparent to those skilled in the art to other liquid-liquid solvent extraction systems as well.

Various modifications apparent to those skilled in the art may be made without departing from the scope or

TABLE III

COMPARATIVE ASPECTS OF VARIOUS SEPARATION METHODS

| METHOD | SOLVENT-SYSTEM | DRIVING FORCE | MEMBRANE USED | MASS TRANSFER MECHANISM |
|---|---|---|---|---|
| Membrane Solvent-Extraction | Two immiscible Solvents | Chemical potential depending on the partition coefficient of the solute in the two solvents | Non-porous, solvent swollen membrane | Solutes from one solvent molecularly dissolved in swollen membrane and transferred to extracting solvent |
| Reverse Osmosis | One solvent | High pressure gradient | " | Solvent molecules molecularly dissolved in swollen membrane and forced to leave conc. solution |
| Ultrafiltration | " | Med. pressure gradient | " | Solvent and low MW species dissolved in swollen membrane and forced to leave conc. solution |
| Dialysis | " | Concentration gradient | Porous or non-porous membrane | Solute leaves conc. solution |
| Electro-dialysis | " | Electromotive force | Charged, non-porous solvent-swollen membrane | Ionic species forced through ion-selective membranes to concentrate |
| Direct Extraction Via porous partition | Two immiscible solvents | Chemical potential depending on the partition coefficient of the solute in the two solvents | Porous membrane or partition wall | Solutes from one solvent transferred to extracting solvent via direct solvent-solvent contact |

We claim:

1. A solvent extraction process which comprises the steps of contacting one side of a polymeric substantially non-porous membrane with a first solvent liquid B containing a solute material A and contacting the other side of said membrane with an extracting second solvent liquid C which is substantially immiscible with liquid B, said membrane being swollen by the respective solvents thereby forming an intermediary zone and allowing the diffusion through the swollen membrane of the solute material A while preventing direct phase to phase contact between solvent liquids B and C, and wherein the diffusivity of A in the membrane from B and C is in the range of about $1 \times 10^{-9}$ to about $1 \times 10^{-4}$ cm$^2$/sec., and maintaning the separation of liquids B and C by said membrane until said solute A has been substantially extracted from liquid B through a solvent swollen membrane into liquid C.

2. The process of claim 1 wherein liquid B is inorganic and liquid C is organic.

3. The process of claim 1 wherein liquid B is acid.

4. The process of claim 1 wherein liquid B is basic.

5. The process of claim 1 wherein said liquid B contains a plurality of solutes.

6. The process of claim 1 wherein said membrane is a composite non-porous solvent swollen membrane.

7. The process of claim 1 wherein the extraction of the solute is effected at a temperature of from about the freezing point of the solutions to about 200°C.

8. The process of claim 1 wherein said membrane has a solvent content of from about 10 to about 95%.

9. The process of claim 1 wherein said membrane is a hollow fiber with O.D. 40 μm to 500 μm and I.D. 30 μm to 490 μm.

10. The process of claim 1 wherein A is ε-caprolactam; B is water and C is chloroform.

11. The process of claim 1 wherein A is dichloroethane; B is water and C is n-heptane.

12. The process of claim 1 wherein A is dinitrotoluene; B is water and C is toluene.

13. The process of claim 1 wherein A is ε-caprolactam; B is water and C is tetrachloroethane.

14. The process of claim 1 wherein A is ε-caprolactam; B is aqueous sulfuric and C is chloroform.

15. The process of claim 1 wherein A is ε-caprolactam; B is aqueous sulfuric acid and C is tetrachloroethane.

16. The process of claim 1 wherein A is toluene diamine; B is water and C is dinitrotoluene.

17. The process of claim 1 wherein A is phenol; B is water and C is toluene.

18. The process of claim 1 wherein A is phenol; B is water and C is a long chain amine having a carbon chain of from 4 to 30 carbon atoms.

19. The process of claim 1 wherein A is phenol; B is water and C is a solution of a long chain amine having from 4 to 30 carbon atoms in toluene.

20. The process of claim 1 wherein A is toluene; B is water and C is n-alkane.

* * * * *